United States Patent

Kitai

Patent Number: 5,772,300
Date of Patent: Jun. 30, 1998

[54] LIQUID CRYSTAL PANEL AND LIQUID CRYSTAL PROJECTOR

[75] Inventor: Hisao Kitai, Kanagawa, Japan

[73] Assignee: Sony Corporation, Japan

[21] Appl. No.: 720,962

[22] Filed: Oct. 10, 1996

[30] Foreign Application Priority Data

Oct. 18, 1995 [JP] Japan .................................. 7-269713

[51] Int. Cl.$^6$ ............................................... G03B 21/14
[52] U.S. Cl. ............................. 353/57; 353/60; 349/161
[58] Field of Search ................................ 353/52, 54, 56, 353/57, 60, 61; 349/161

[56] References Cited

U.S. PATENT DOCUMENTS

| | | | |
|---|---|---|---|
| 4,904,079 | 2/1990 | Yoshimura | 353/60 |
| 4,950,072 | 8/1990 | Honda | 353/61 |
| 4,952,925 | 8/1990 | Haastert . | |
| 4,963,001 | 10/1990 | Miyajima | 353/60 |
| 5,076,543 | 12/1991 | Mandai | 353/60 |

FOREIGN PATENT DOCUMENTS

| | | |
|---|---|---|
| 02 262615 | 10/1990 | European Pat. Off. . |
| 04 031847 | 2/1992 | European Pat. Off. . |
| 05 232427 | 9/1993 | European Pat. Off. . |
| 5158152 | 6/1993 | Japan . |

Primary Examiner—William Dowling
Attorney, Agent, or Firm—Ronald P. Kananen

[57] ABSTRACT

A liquid crystal panel unit and a liquid crystal projector incorporating the liquid crystal panel unit. The panel includes a metallic sealed container with a light-transmissive window, a liquid crystal panel accommodated in the sealed container so as to allow light being transmitted to leave the light-transmissive window, and a fan accommodated in the sealed container so as to be spaced from the liquid crystal panel. The liquid crystal panel unit can reliably cool the liquid crystal panel, without any deterioration in the image quality due to dust. A liquid crystal projector using the liquid crystal panel unit is also provided.

12 Claims, 3 Drawing Sheets

LIQUID CRYSTAL PANEL AND LIQUID CRYSTAL PROJECTOR

BACKGROUND OF THE INVENTION

1. Field of the Invention

The present invention broadly relates to a liquid crystal panel unit, and, more particularly, to a liquid crystal panel unit in which a liquid crystal panel is more reliably cooled to prevent the temperature of the panel from rising during operation, and a liquid crystal projector utilizing such a liquid crystal panel unit.

2. Description of the Related Art

The liquid crystal display (LCD) panel is known as one providing an excellent display of a quality comparable to that provided by a cathode ray tube (CRT). Such an LCD panel is particularly advantageous compared to the CRT in that it can be made thinner than the CRT, since it can provide a color display merely by the addition of a color filter for each image pixel and by using an optical means such as an illuminating light source.

However, during operation, the temperature of such a liquid crystal panel rises when it receives light from a light source.

As the liquid crystal panel becomes very hot, the polarization plate melts, or the transition temperature of the liquid crystal is exceeded, which may degrade display performance, such as contrast, and reduce reliability. To overcome such problems, such a liquid crystal panel, used for example in a liquid crystal projector, is usually cooled, during operation, in order to control the extent to which the temperature of the liquid crystal panel rises.

Conventional cooling structures for cooling a liquid crystal panel include an air-cooling type structure and a liquid-cooling type structure.

In a typical air-cooling type structure, a fan is disposed near the liquid crystal panel to blow air to the liquid crystal panel, as a result of which the liquid crystal panel is cooled.

In a typical liquid-cooling type structure, a liquid crystal panel is previously accommodated in a suspended state in a box to be filled with a cooling liquid. Then, the box is filled with a cooling medium, such as silicone oil, within which the liquid crystal panel is suspended. The liquid crystal panel is cooled as a result of circulating the cooling medium.

However, a fan is used in the air-cooling type structure, so that though the liquid crystal panel is cooled, dust is produced around the liquid crystal panel, and sticks onto the panel. When such a liquid crystal panel cooled by air is used, for example, in a liquid crystal projector, the dust is projected by the projector, thereby reducing the image quality. In addition, since a fan is used, noise is generated by the fan motor and blades of the fan in operation, thereby making the projector in such a case a poor commercial product.

On the other hand, when cooling is performed using liquid, problems such as liquid leakage may occur, or there may be a transmission loss due to the index of refraction of the liquid, leading to the possibility of deteriorations in optical properties. In addition, it is difficult to produce a liquid-cooling structure in which the liquid is free from floating dust or one in which the liquid does not leak, resulting in increased costs.

SUMMARY OF THE INVENTION

In view of the above-described problems, an object of the present invention is to provide a liquid crystal panel unit which can reliably cool a liquid crystal panel, without any deterioration in the image quality due to dust, and a liquid crystal projector using the same.

To this end, according to one aspect of the present invention, there is provided a liquid crystal panel unit, comprising: a sealed container, made of a material with high thermal conductivity, having a light-transmission window; a liquid crystal panel accommodated in the sealed container so as to allow light being transmitted to leave the light-transmission window; and a fan accommodated in the sealed container so as to be spaced from the liquid crystal panel.

In a preferred form of the invention, the material with high thermal conductivity may be a metal.

In a preferred form of the invention, the liquid crystal panel unit may further comprise a polarizing plate disposed in correspondence with the light-transmission window and at an outer side of the sealed container.

In a preferred form of the invention, the fan may be disposed such that the wind produced thereby does not directly hit the surface of the liquid crystal panel.

In a preferred form of the invention, the liquid crystal panel unit may further comprise heat radiating means provided at an outer side of the sealed container.

In a preferred form of the invention, the heat radiating means may be disposed at a location other than where the light-transmission window is disposed.

In a preferred form of the invention, the heat radiating means may be at least one of a radiating fin, a heat pipe, and a Peltier element.

According to the liquid crystal panel unit of the present invention, the liquid crystal panel and the fan are accommodated in a sealed container, so that the liquid crystal panel can be cooled by air, without having to introduce outside air into the sealed container. In addition, since the sealed container is made of metallic material, it obviously has high thermal conductivity and is an excellent radiator of heat, so that heat, generated within the sealed container during operation of the liquid crystal panel, is transmitted to the sealed container by wind produced by the fan, and dissipated through and out the sealed container with high efficiency. Further, since the fan is accommodated in the sealed container, noise produced during operation of the fan, including the noise of the fan motor and blades of the fan, is blocked by the sealed container, thus reducing the noise level during operation of the fan.

According to another aspect of the present invention, there is provided a liquid crystal projector, comprising: a liquid crystal panel unit including (i) a sealed container, made of a material with high thermal conductivity, having a light-transmission window, (ii) a liquid crystal panel accommodated in the sealed container so as to allow light being transmitted to leave the light-transmission window; and (iii) a fan accommodated in the sealed container so as to be spaced from the liquid crystal panel; and optical means for causing light to be incident to the liquid crystal panel, and enlarging and projecting light transmitted from the liquid crystal panel.

In a preferred form of the invention, the optical means may comprise a light source for illuminating the liquid crystal panel and a projecting lens for projecting light transmitted from the liquid crystal panel.

In a preferred form of the invention, the liquid crystal projector may further comprise a screen for displaying thereon an image obtained by means of the liquid crystal panel.

In a preferred form of the invention, the fan may be disposed such that wind produced thereby does not directly hit the surface of the liquid crystal panel.

In a preferred form of the invention, the liquid crystal projector may further comprise heat radiating means provided at an outer side of the sealed container.

According to the liquid crystal projector of the present invention, the above-described liquid crystal panel unit and the above-described optical means are provided, so that cooling by air can be performed, without introduction of outside air into the sealed container of the liquid panel unit, thus preventing reduction in image quality due to dust.

BRIEF DESCRIPTION OF THE DRAWINGS

FIG. 2A is a sectional side elevational view of an embodiment of a liquid crystal panel unit, while FIG. 2B is a front elevational view of the embodiment of the liquid crystal panel unit.

DESCRIPTION OF THE PREFERRED EMBODIMENTS

A description will now be given of the preferred embodiments of the present invention.

Figure 1:
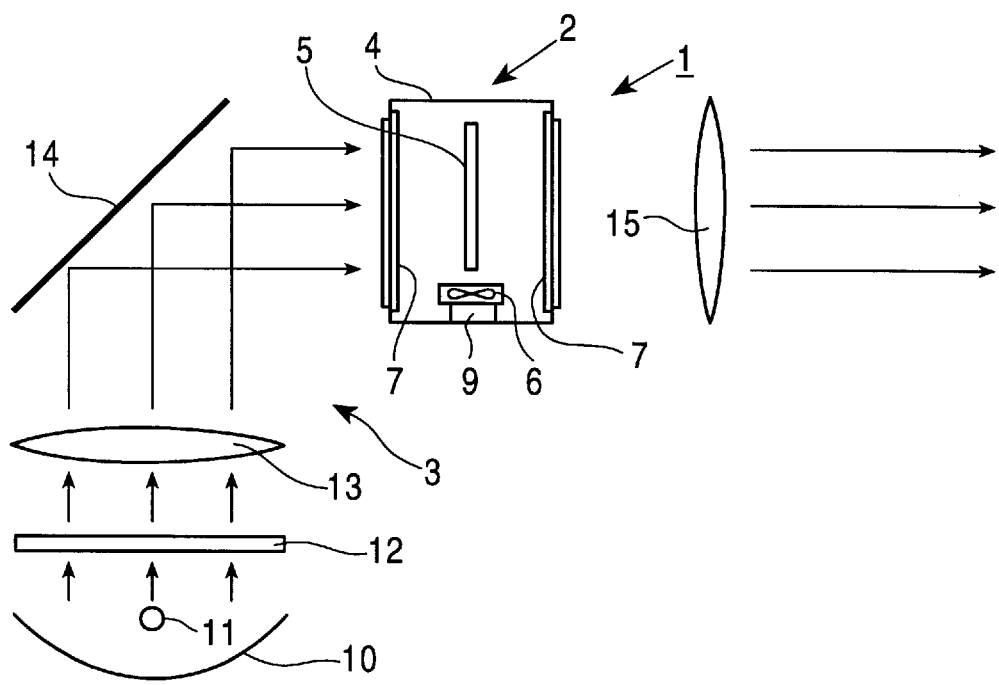
FIG. 1 is a schematic structural view of an embodiment of a liquid crystal projector in accordance with the present invention.

FIG. 1 illustrates a liquid crystal projector in accordance with the present invention. Referring to the FIG. 1, reference numeral 1 denotes a liquid crystal projector including a liquid crystal panel unit 2, and optical means 3 which causes light to impinge upon the liquid crystal panel unit 2 and the light transmitted through the liquid crystal unit 2 to leave therefrom.

The liquid crystal panel unit 2, in an embodiment of the present invention, comprises a rectangular, sealed container 4, a liquid crystal panel 5, and a fan 6. The panel 5 and the fan 6 are both accommodated in the sealed container 4. The sealed container 4 is made of metallic material with high thermal conductivity, such as aluminum, copper, iron, or an alloy thereof, so that the sealed container 4 is an excellent radiator of heat. Light-transmissive windows 7 are provided on two opposing and corresponding sides of the sealed container 4. The windows 7 are made of transparent material which transmits light, such as glass. The liquid crystal panel 5 is disposed between the light-transmissive windows 7.

The light-transmissive windows 7 are bonded onto an opening of the sealed container 4, with a soft and flexible adhesive containing resin or the like, such as silicone rubber. Such an adhesive prevents deformation of the sealed container 4, even when it becomes hotter during operation of the liquid crystal projector 1, since the adhesive absorbs the difference in the coefficients of thermal expansion of the metallic portion of the sealed container 4 and the light-transmissive windows 7 made of glass or the like.

As will be described below, the sealed container 4 makes it possible to achieve noise insulation and to dissipate heat from the interior thereof. The sealed container must be thick in order to achieve noise insulation, and have a large surface area in order to allow heat dissipation. When the sealed container is made thick, the light-transmissive window 7 must also be made thicker. In such a case, the transmissivity is reduced by a corresponding amount, so that both heat dissipation and noise insulation are taken into account when determining how thick the sealed container should be made.

Figures 2A, 2B:
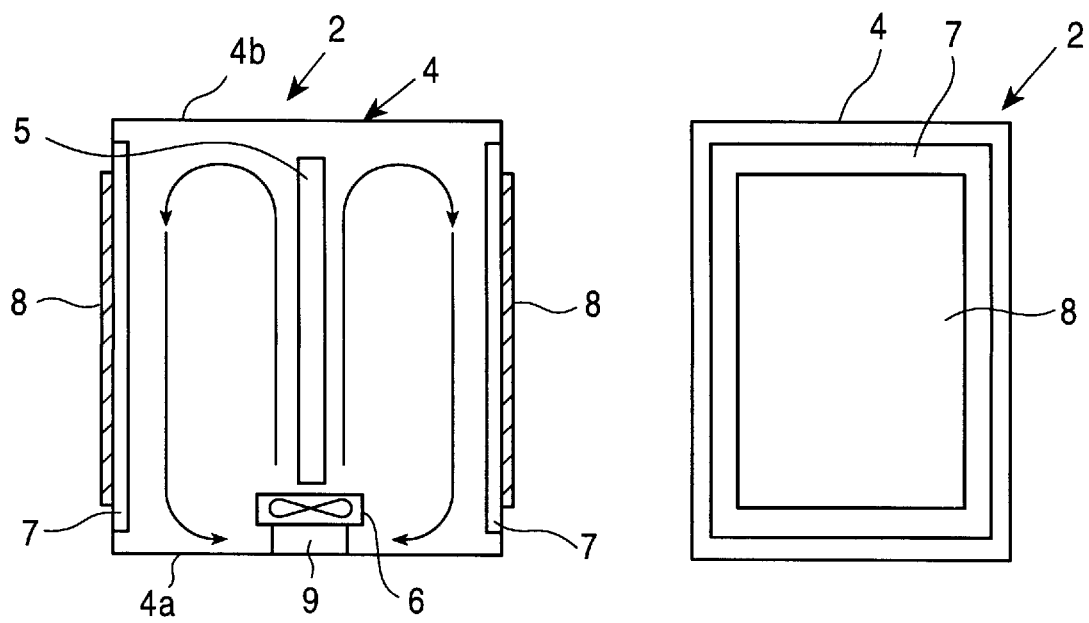

The liquid crystal panel 5 is disposed parallel to and midway between the light-transmissive windows 7, 7, such that a side end of the panel 5 is spaced from an inner side face of the sealed container 4. The panel 5 is connected to an electrical power supply (not shown) to apply power thereto. In the liquid crystal panel 5, polarizing plates are usually not provided on the light incoming surface and the light outgoing surface of the liquid crystal panel. Instead, polarizing plates 8 are provided directly onto the outer surfaces of the light-transmissive windows 7, as shown in FIGS. 2A and 2B. Thus, the polarizing plates are sufficiently cooled by outside air, when they are heated during operation of the liquid crystal projector 1, as will be described below.

The fan 6, being a small-sized microfan, is used to cool the liquid crystal panel 5 by air. The electrical power supply cord (not shown) is one which is led out from the sealed container 4. In addition, the fan 6 is disposed between the lower end face of the liquid crystal panel 5 and a bottom plate 4a of the sealed container 4, such that its blowing side is spaced from and faces the panel 5 in order to prevent vibrations of the fan motor (not shown) from directly being transmitted to the liquid crystal panel 5. With its sucking side spaced apart from the bottom plate 4a, the fan 6 is affixed to the bottom plate 4a of the sealed container 4, using vibration-proof, sound-absorbing material 9, such as rubber, so as not to obstruct operation thereof.

By virtue of such a construction, the wind from the fan 6 rises along the front and back faces of the liquid crystal panel 5 while directly hitting the front and back faces, as indicated by the arrows in FIG. 2A, during which the wind takes away heat from the liquid crystal panel 5, as a result of which the temperature of the wind rises. The hotter wind hits the top plate 4b or the like of the sealed container 4 and circulates toward the fan 6, after which the wind is sucked in by the fan 6. Here, the wind exchanges heat with the top plate 4b, or the like, of the sealed container 4, whereby the heat generated by the liquid crystal panel 5 is dissipated out the sealed container 4, as a result of which the liquid crystal panel 5 is efficiently cooled.

As illustrated in FIG. 1, the optical means 3 comprises a concave mirror 10, a light source 11, a heat ray cut-off filter, a convex lens 13, a reflecting mirror 14, and a projecting lens 15. The concave mirror 10 serves as a reflecting mirror. The light source 11 is placed in front of the concave mirror 10. The heat ray cut-off filter 12 is placed in front of the light source 11. The convex lens 13 is placed in front of the heat ray cut-off filter 12. The convex lens 13 is placed in front of the reflecting mirror 14. The projecting lens 14 is placed in front of the liquid crystal panel unit 5 which is disposed in front of the reflecting mirror 14.

When such a liquid crystal projector 1 with the above-described construction is operated, light from the light source 11 is gathered by the concave mirror 10 and arrives at the heat ray cut-off filter 12 which removes unwanted heat from the light. The light, then, passes through the convex lens 13, the reflecting mirror 14, and impinges upon the liquid crystal panel unit 2, after which the light is linearly polarized by a polarizing plate 8 disposed at the side where the light enters the liquid crystal panel unit 2. Thereafter, the light in a linearly polarized state passes through a light-transmissive window 7 and impinges upon the liquid crystal panel 5, after which the light is optically rotated in accordance with the pattern of applying power to the panel 5 by previously applying power to the liquid crystal panel 5. The light, then, passes through the other light-transmissive window 7, and is repolarized by the other polarizing plate 8 disposed at the side where light leaves the liquid crystal panel unit. After passing through the projecting lens 15, the image produced by optically polarizing the light in accordance with the pattern of applying power to the panel 5 is enlarged and projected onto a screen (not shown).

When the liquid crystal projector 1 operates as described above, the liquid crystal panel 5 is heated by light with high intensity, but is efficiently cooled in the sealed container 4 by air by means of the fan 6 accommodated in the sealed container 4 in the same way as the light crystal panel 5.

Accordingly, in the liquid crystal projector 1 of the present embodiment, the liquid crystal panel unit 2 is so constructed as allowing efficient cooling of the liquid crystal panel 5. In addition, since the fan 6 is also accommodated in the sealed container 4, normal operation of the liquid crystal panel 5 is achieved by controlling the extent to which the temperature of the panel 5 rises, without introduction of outside air into the sealed container 4, and thus without dust or the like in the outside air sticking onto the liquid crystal panel 5, thus preventing deterioration of the image quality due to dust sticking onto the panel 5.

The sealed container 4, which is made of a metal with high thermal conductivity, dissipates heat very well. Therefore, heat, generated during operation of the liquid crystal panel 5 and transported to the inner surfaces of the sealed container 4 by means of the fan 6, is efficiently dissipated from the sealed container 4, so that the liquid crystal panel 5 is cooled with very high efficiency.

Since the fan 6 is disposed in the sealed container 4, the noise of the fan motor and blades of the fan, produced during operation of the fan 6, are blocked by the sealed container 4, thereby reducing the noise level during operation of the fan 6.

It is desirable to assemble the liquid crystal panel unit 2 in a clean environment, such as a clean room, so as to protect the sealed container 4 from dust. In addition, it is preferable to protect the component parts which are mounted to the liquid crystal panel unit 2 from dust, during assemblage.

Figure 3:
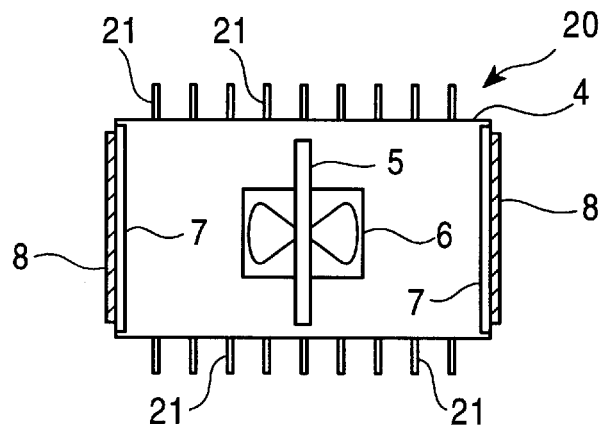
FIG. 3 is a sectional plan view of a first modification of the liquid crystal panel unit.

FIG. 3 is a sectional plan view of a modification of the liquid crystal panel unit. The liquid crystal panel unit 20 of FIG. 3 differs from the liquid crystal panel unit 2 of FIG. 2A in that radiating fins are provided as radiating means on both side faces of the sealed container 4. The radiating fins 21 allow the sealed container 4 to become an excellent radiator of heat, so that the liquid crystal panel 5 can be cooled by means of the fan 6 with even higher efficiency. Though the radiating fins 21 have been described as being provided on both side faces of the sealed container 4, they may be provided on one side face, or the top face of the sealed container 4.

Figure 4:
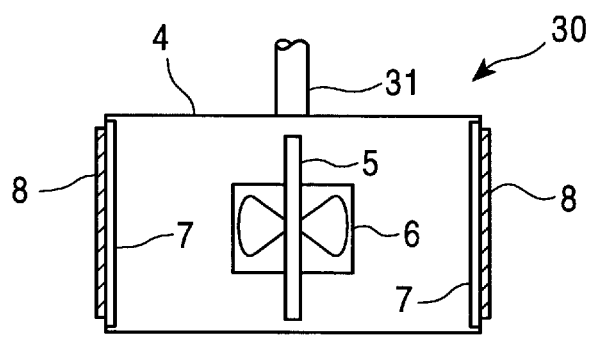
FIG. 4 is a sectional plan view of a second modification of the liquid crystal panel unit.

FIG. 4 is a sectional view of a second modification of the liquid crystal panel unit. The liquid crystal unit 30 of FIG. 4 differs from the liquid crystal panel unit 2 of FIG. 2A in that a heat pipe 31 is provided as radiating means on one of the sides of the sealed container 4. The heat pipe 31 is used for transporting heat by absorption and discharge of latent heat by evaporation and condensation, causing the sealed container 4 to dissipate heat extremely well. Therefore, the liquid crystal panel unit 30 is one in which the liquid crystal panel 5 is cooled by means of the fan 6 with even higher efficiency, so that such a construction makes it possible to make the sealed container 4 more compact, or the like.

Figure 5:
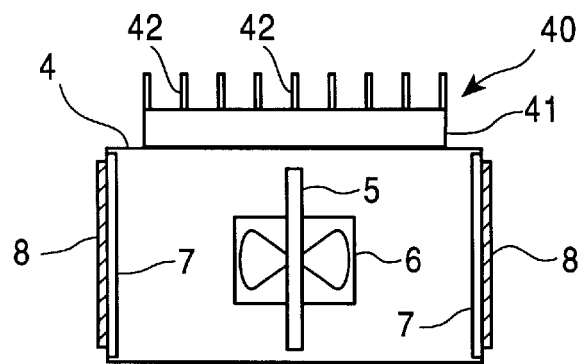
FIG. 5 is a sectional plan view of a third modification of the liquid crystal panel unit.

FIG. 5 is a sectional plan view of a third modification of the liquid crystal panel unit. The liquid crystal panel unit 40 of FIG. 5 differs from the liquid crystal panel unit 2 of FIG. 2A in that a Peltier element 41 is provided as radiating means on one of the sides of the sealed container 4. More specifically, the cooling side of the Peltier element 41 is in contact with a side face of the sealed container 4, while the radiating side of the element 41 is faced outward. Radiating fins 42 are provided at the radiating side of the Peltier element 41 in order to further increase the cooling (radiating) effect of the Peltier element 41. Accordingly, the liquid crystal panel unit 40 allows the liquid crystal panel 5 to be cooled by means of the fan 6 with even higher efficiency.

Figure 6:
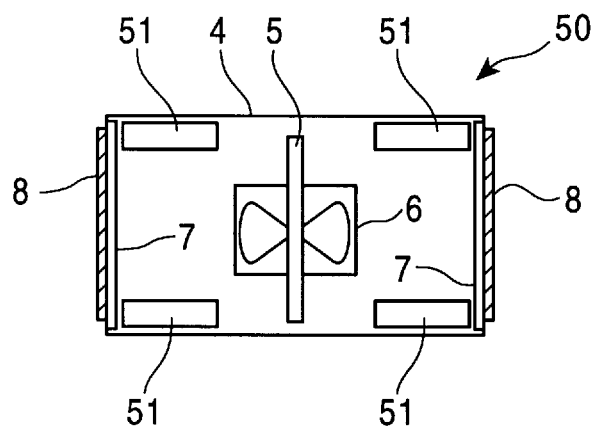
FIG. 6 is a sectional plan view of a fourth modification of the liquid crystal panel unit.

FIG. 6 is a sectional plan view of a fourth modification of the liquid crystal panel unit. The liquid crystal panel unit 50 of FIG. 6 differs from the liquid crystal panel unit 2 of FIG. 2A in that necessary component parts 51 of the liquid crystal projector, such as some of the component parts of the optical means 3, are disposed within the sealed container 4 in order to make the liquid crystal projector as a whole more compact. Accordingly, the liquid crystal panel unit 51 as a whole can be made more compact, and become an excellent commercial product.

EXPERIMENTAL EXAMPLES

Experiments were conducted to confirm the effects of the liquid crystal panel unit in accordance with the present invention as described below.

Figure 7:
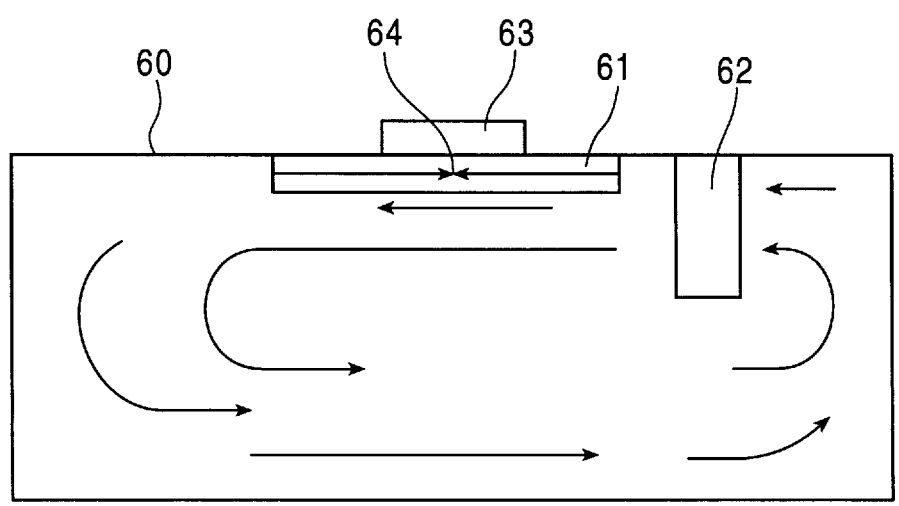
FIG. 7 is a sectional side elevational view of the liquid crystal panel unit used in an experiment.

The liquid crystal panel unit was formed so as to have the structure shown in FIG. 7. Referring to FIG. 7, reference numeral 60 denotes a metallic sealed container; reference numeral 61 denotes a liquid crystal panel; and reference numeral 62 denotes a fan. More specifically, in the liquid crystal panel unit, the liquid crystal panel 61 was affixed to an inner face of the sealed container 60, and the fan 62 was disposed at one side of the liquid crystal panel 61 such that its blowing side faced the liquid crystal panel 61. To cause the liquid crystal panel 61 to generate heat, a ceramic heater (100 V–15 W) 63 was affixed to the liquid crystal panel 61 so as to be disposed at an outer side of the sealed container 60. In addition, a temperature sensor 64 was mounted to the liquid crystal panel 61 in order to measure the temperature of the liquid crystal panel 61.

The dimensions of the sealed container 60 used were 165×235×75 mm. The fan 62 used was a microfan (SEPA MF30A-12) manufactured by Nihon Keiki-sha.

The liquid crystal panel unit with the above-described construction was used in the experiments. More specifically, power was applied to the ceramic heater 63 to heat the liquid crystal panel 61, and after the temperature of the liquid crystal panel 61 was maintained at a constant level, power was applied to the fan 62 by continually applying power to the ceramic heater 63 in order to operate the fan 62.

Measurements were conducted of the voltages and currents supplied to the fan 62, and of the wind speeds produced by the fan 62. In addition, the temperatures of the liquid crystal panel 61 for the measured voltages, currents, and wind speeds were measured. The results are given in Tables 1, 2, and 3. The results given in the three tables were obtained by varying the amount of power applied to the ceramic heater 63.

TABLE 1

Heater 3.4 W

| Liquid Crystal Portion Temperature | Wind Speed | Fan Voltage | Fan Current |
|---|---|---|---|
| 95.4° C. | 0 m/s | 0 V | 0 mA |
| 67.3° C. | 0.8 m/s | 6 V | 0.02 mA |
| 61.3° C. | 1.5 m/s | 8 V | 0.03 mA |
| 58.2° C. | 2.0 m/s | 10 V | 0.04 mA |
| 56.0° C. | 3.0 m/s | 12 V | 0.05 mA |

TABLE 2

Heater 2.7 W

| Liquid Crystal Portion Temperature | Wind Speed | Fan Voltage | Fan Current |
|---|---|---|---|
| 84.4° C. | 0 m/s | 0 V | 0 mA |
| 62.2° C. | 0.8 m/s | 6 V | 0.02 mA |
| 53.0° C. | 1.5 m/s | 8 V | 0.03 mA |
| 51.3° C. | 2.0 m/s | 10 V | 0.04 mA |
| 50.1° C. | 3.0 m/s | 12 V | 0.05 mA |

TABLE 3

Heater 2.2 W

| Liquid Crystal Portion Temperature | Wind Speed | Fan Voltage | Fan Current |
|---|---|---|---|
| 74.7° C. | 0 m/s | 0 V | 0 mA |
| 55.0° C. | 0.8 m/s | 6 V | 0.02 mA |
| 49.3° C. | 1.5 m/s | 8 V | 0.03 mA |
| 46.2° C. | 2.0 m/s | 10 V | 0.04 mA |
| 44.8° C. | 3.0 m/s | 12 V | 0.05 mA |

The results in Tables 1, 2, and 3 showed that the liquid crystal panel 61 was sufficiently cooled by the fan 62.

As can be seen from the foregoing description, according to the liquid crystal panel unit of the present invention, the liquid crystal panel and the fan are accommodated in a sealed container, allowing the liquid crystal panel to be cooled by air, without introduction of outside air into the sealed container. In addition, since the sealed container is made of metallic material which dissipates heat extremely well, heat of the liquid crystal panel is dissipated through and out the metallic sealed container with high efficiency.

In addition, since the fan is accommodated in a sealed container, noise produced during operation of the fan, including noise of the fan motor and blades of the fan, is blocked by the container, thus making it possible to reduce the noise level, during operation of the fan.

The liquid crystal projector comprises the above-described liquid crystal panel unit and the above-described optical means. Therefore, it is a projector in which the liquid crystal panel unit is cooled by air, without introduction of outside air into the sealed container, thus preventing a reduction in the image quality due to dust. Accordingly, the liquid crystal projector in accordance with the present invention is an excellent commercial product.

What is claimed is:

1. A liquid crystal panel unit, comprising:

a sealed container, made of a material with high thermal conductivity, having a light-transmission window;

a liquid crystal panel accommodated in said sealed container so as to allow light being transmitted to leave the light transmission window;

a fan accommodated in said sealed container so as to be spaced from said liquid crystal panel; and a polarizing plate disposed in correspondence with the light-transmission window and at an outer side of said sealed container.

2. A liquid crystal panel unit according to claim 1, wherein the material with high thermal conductivity is a metal.

3. A liquid crystal panel unit according to claim 1, wherein said fan is disposed such that the wind produced thereby does not directly hit the surface of said liquid crystal panel.

4. A liquid crystal panel unit according to claim 1, further comprising heat radiating means provided at an outer side of said sealed container.

5. A liquid crystal panel unit according to claim 4, wherein said heat radiating means is disposed at a location other than where the light-transmission window is disposed.

6. A liquid crystal panel unit according to claim 5, wherein said heat radiating means is at least one of a radiating fin, a heat pipe, and a Peltier element.

7. A liquid crystal projector, comprising:

a liquid crystal panel unit including (i) a sealed container, made of a material with high thermal conductivity, having a light-transmission window, (ii) a liquid crystal panel accommodated in said sealed container so as to allow light being transmitted to leave the light-transmission window; and (iii) a fan accommodated in said sealed container so as to be spaced from said liquid crystal panel;

optical means for causing light to be incident to said liquid crystal panel, and enlarging and projecting light transmitted from said liquid crystal panel; and heat radiating means provided at an outer side of said sealed container, wherein said heat radiating means is at least one of a radiating fin, a heat pipe, and a Peltier element.

8. A liquid crystal projector according to claim 7, wherein said optical means comprises a light source for illuminating said liquid crystal panel and a projecting lens for projecting light transmitted from said liquid crystal panel.

9. A liquid crystal projector according to claim 7, further comprising a screen for displaying thereon an image obtained by means of said liquid crystal panel.

10. A liquid crystal projector according to claim 7, wherein said fan is disposed such that wind produced thereby does not directly hit the surface of said liquid crystal panel.

11. A liquid crystal projector according to claim 7, further comprising heat radiating means provided at an outer side of said sealed container.

12. A liquid crystal projector according to claim 7, further comprising a polarizing plate disposed in correspondence with the light-transmission window and at an outer side of said sealed container.

* * * * *